United States Patent [19]

Lang

[11] 4,144,821
[45] Mar. 20, 1979

[54] AIRCRAFT CARGO PALLET RESTRAINT

[76] Inventor: Robert D. Lang, 633 Lido Park Dr., B-1, Newport Beach, Calif. 92663

[21] Appl. No.: 787,162

[22] Filed: Apr. 13, 1977

[51] Int. Cl.² .................. B60P 7/08; B61D 45/00; B64C 1/20; B65J 1/22
[52] U.S. Cl. .................................. 105/465; 105/482; 244/118 R
[58] Field of Search ........... 105/366 R, 366 E, 366 C, 105/463, 464, 465, 469, 473, 483, 484, 485, 482; 214/84; 244/118 R, 137 R; 193/40

[56] References Cited

U.S. PATENT DOCUMENTS

| | | | |
|---|---|---|---|
| 3,251,489 | 5/1966 | Davidson | 214/84 |
| 3,306,234 | 2/1967 | Hansen et al. | 105/465 X |
| 3,377,040 | 4/1968 | Hansen | 244/118 R |
| 3,480,239 | 11/1969 | Jensen et al. | 244/118 R |
| 3,759,476 | 9/1973 | Goodwin | 105/464 |
| 3,778,012 | 12/1973 | Fernandez | 193/40 X |
| 3,796,397 | 3/1974 | Alberti | 244/118 R |
| 3,800,713 | 4/1974 | Nordstrom | 244/118 R |
| 3,995,562 | 12/1976 | Nordstrom | 105/465 |

Primary Examiner—Frank E. Werner
Assistant Examiner—Howard Beltran
Attorney, Agent, or Firm—Fulwider, Patton, Rieber, Lee & Utecht

[57] ABSTRACT

There is disclosed a cargo restraint for palletized cargo which is detachably secured to rails or frame members such as a conventional seat rail in an aircraft cargo hold. The restraint includes a frame and a folding assembly of a pawl plate member with fore and aft folding support links therefor whereby the pawl plate member can be folded into a retracted position, within the confines of the frame and elevated therefrom into an elevated, cargo pallet engaging position. The pawl plate member extends fore and aft of the support links to restrain the edges of adjacent cargo pallets. The frame is provided with a transverse web immediately forward of the support links to serve as an abutment stop therefor, restraining the links in the extended position and accommodating high acceleration forces in a forward direction. The assembly is provided with a resilient springs to urge it into the retracted position and a locking member secures the assembly in the extended position against the bias of the resilient springs.

10 Claims, 5 Drawing Figures

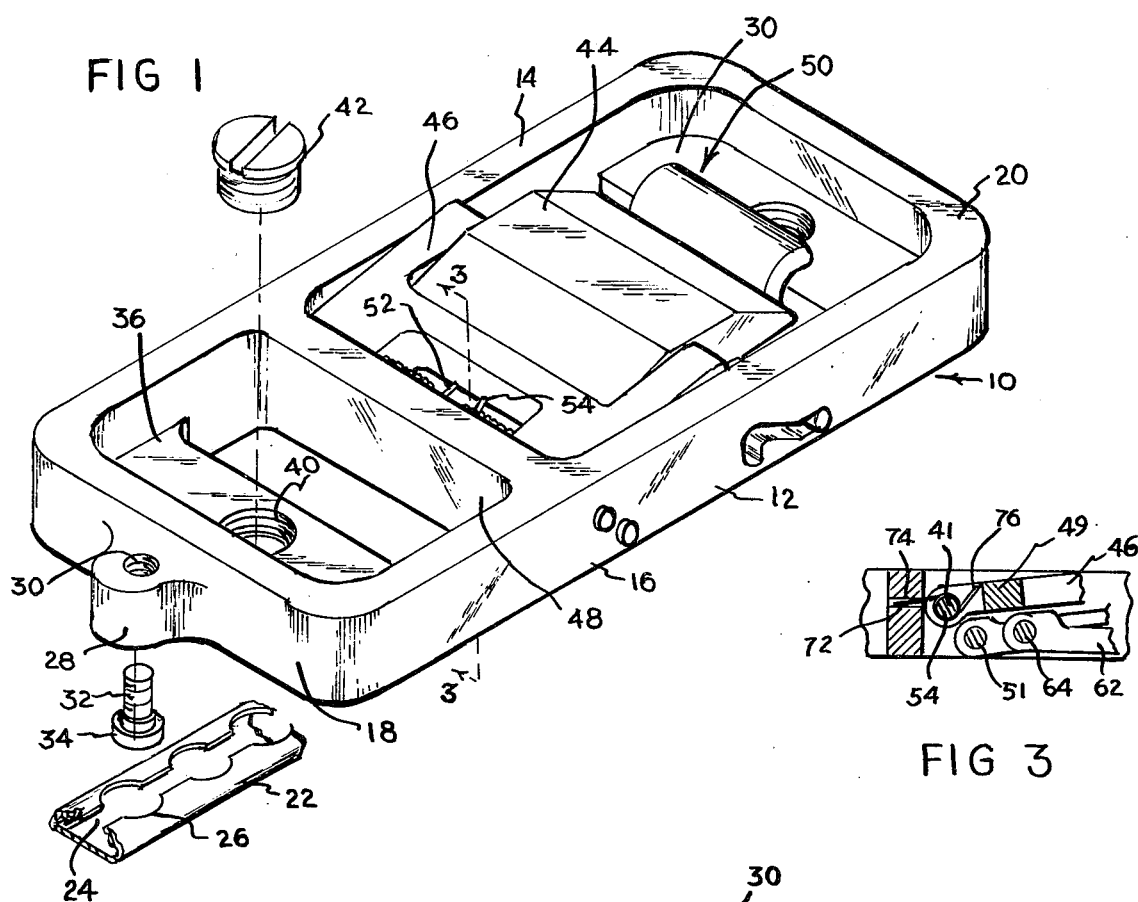
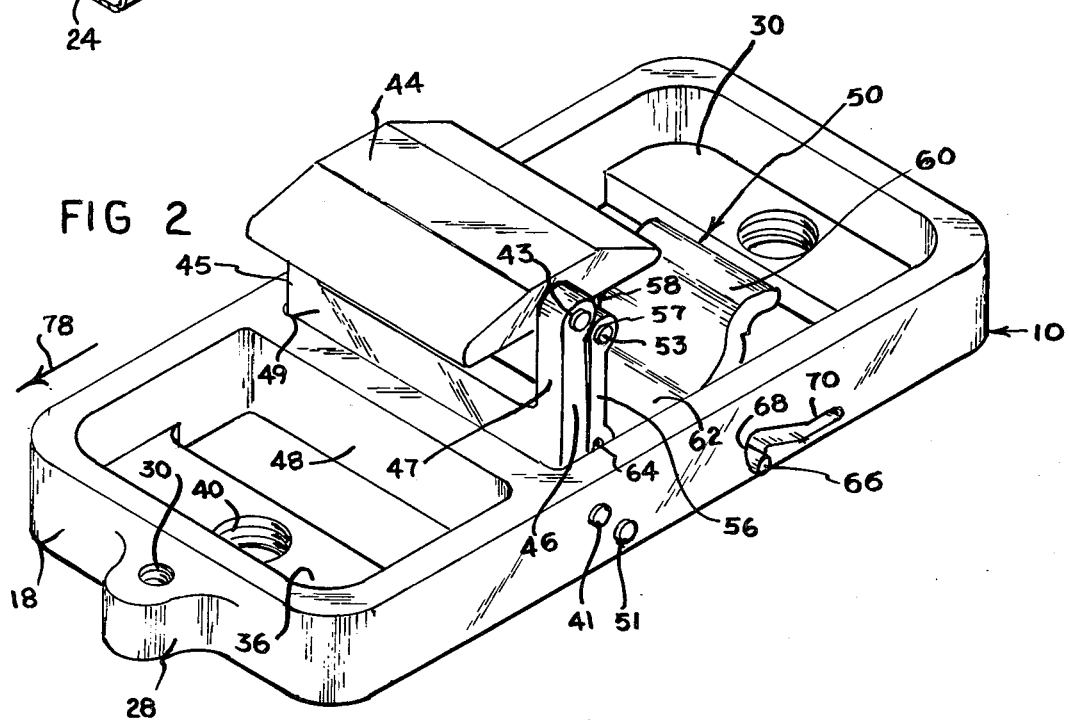

AIRCRAFT CARGO PALLET RESTRAINT

BACKGROUND OF THE INVENTION

This invention relates to a cargo restraint and, in particular, to a restraint for palletized cargo, particularly useful in aircraft.

BRIEF STATEMENT OF THE PRIOR ART

A number of devices have been employed for restraining of cargo in aircraft cargo holds. A widely employed cargo restraint is that which is described in U.S. Pat. No. 3,251,489. This cargo restrain comprises a frame which is removably mounted on trays which are mounted in the floor of the aircraft, typically secured to seat rails and the like. The locking restrain, briefly comprises a foldable assembly of complementary dogs carried on pivotally mounted arms. The assembly is foldable into the confines of the frame to remove it as an obstruction during the loading and unloading of the cargo.

While the previously patented device functions satisfactory as a cargo restraint, it is not optimumly designed for carrying the variable gravitational loading experienced with aircraft, but, instead has massive interlocking dogs. Typically, the restraint should be designed to accept forward loadings of relatively high accelerations, typically up to about 9 G-forces while the restraint can be designed to accept lesser acceleration forces in the rearward or vertical directions, typically up to about 1.5 G-forces for each of these directions.

BRIEF STATEMENT OF THE INVENTION

This invention comprises a folding cargo restraint which is particularly designed for accepting a variable maximum acceleration forces in different directions. The restraint comprises a rectilinear frame with a pawl plate member that is pivotally mounted to the frame by aft and fore link means interconnected between the pawl and the longitudinal members of the frame as in a parallelogram, thereby permitting the pawl plate member to be raised to an erected, cargo-restraining position and folded to a retracted position within the confines of the frame. The frame also includes a transverse rib link means located forwardly of the aft and fore to serve as an abutment, providing a very high acceleration force resistance. The assembly also includes lock means engagable between a detenting position to lock the link means in the erected position. This lock means is moveable into a releasing position which permits the assembly to fold into the frame. In the preferred embodiment, resilient means in the form of helical torsion springs are employed to urge the assembly toward its folded position.

BRIEF DESCRIPTION OF THE DRAWINGS

The invention will be described with reference to the drawings of which:

FIG. 1 illustrates a cargo restraint of the invention in its folded configuration and in partial disassembly of its means for attachment to supporting structure;

FIG. 2 illustrates the cargo restraint of FIG. 1 in its extended position;

FIG. 3 illustrates the resilient means employed in the restraint; and

DESCRIPTION OF THE PREFERRED EMBODIMENTS

Figure 4:
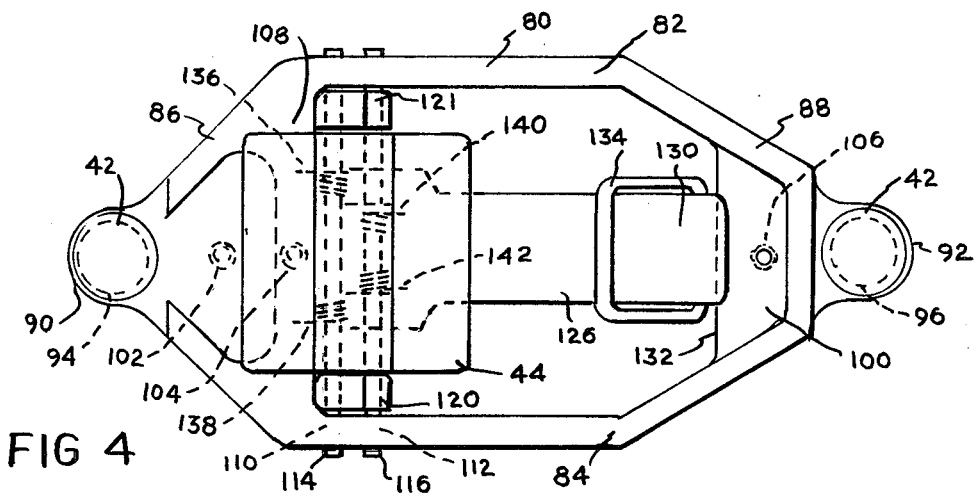
FIGS. 4 and 5 illustrate another cargo restraint of the invention.

Referring now to FIG. 1, the restraint 10 of the invention is shown as comprising a frame 12 formed of parallel, longitudinal members 14 and 16 with end cross members 18 and 20.

The frame is adapted for the removable attachment to fixtures such as a seat rail 22 of a supporting structure, typically of an aircraft cargo hold. The seat rail, which is conventional in construction, is a elongated channel member having a central longitudinal slot 24 along its top surface with a plurality of spaced-apart intersecting apertures 26.

The frame member distally bears lugs 28 along its center line. Each lug has a threaded bore 30 in which is inserted a stud 32 having a large head 34 which can track within the channel of seat rail 22.

Interiorly, frame 12 also bears distal transverse webs 36 and 38 each of which have a central, threaded aperture 40 which receives a threaded plug 42 that is of a diameter for removable reception within the spaced-apart apertures 26.

The aforedescribed attachment means permit the removable securing of the cargo restraint 10 at any of a variety of preselected positions on the elongated seat rail 22 with the distal studs 32 having their heads 34 captured within the channel of the rail 22 thereby providing the vertical restrain of the member and with plugs 42 threaded into extending projections from the undersurface of the restrain 10 and into the spaced-apart apertures 26, thereby providing the fore and aft and lateral securing of the restraint.

The frame also bears a foldable assembly of cargo restraining means. This following assembly includes pawl plate member 44 which is pivotally mounted within frame 12 by fore link means 46 and cooperating aft link means described in greater detail hereinafter in reference to FIG. 2. The frame also bears a transverse rib 48 immediately forward of the aft and fore link means that serves as a foreward abutment stop for the folding assembly as described in greater detail hereinafter, and includes lock means generally indicated at 50 for securing the assembly in its erected position. The assembly also includes resilient means shown as a pair of torsion helical coil springs 52 and 54 which are mounted to bias the assembly into its retracted, folded position, shown in FIG. 1.

Referring now to FIG. 2, the cargo restraint 10 is shown with the pawl plate member 44 in its erected, cargo-restraining posiiton. As there illustrated, the pawl plate member is vertically elevated above the plane of the frame 12 by the fore link means 46 and the aft link means 56. The fore link means has a generally H-shape configuration having spaced-apart legs 45 and 47 interconnected by a transverse crossbar 49. The aft link means 56 can comprise a pair of support arms.

The fore and aft link means are pivotally connected to the pawl plate member by distal apertures such as 41 and 57 in the fore and aft link means, respectively. These apertures receive pin members 43 and 53, the latter extending through a bore in a transverse, raised rib 58 on the undersurface of pawl member 44.

The fore and aft link means are pivotally interconnected at their opposite ends to the longitudinal frame members by pins 41 and 51. The fore and aft link means are mounted in parallel to the pawl plate member at longitudinal frame whereby the entire assembly is in the form of a parallelogram.

The locking means 50 comprises a lever 60 that projects from the rear edge of the locking plate portion 62 of the lock means. The locking plate portion 62 extends into pivotal interconnection with the aft link means 56; its forward edge projects between the spaced-apart link arms of the aft link means and into pivotal engagement therewith by pin 64 which extends through a transverse bore in the leading edge of the locking plate portion 62 of lock means 50.

The locking means 50 is engageable between a detenting position, shown in FIG. 2 and releasing position; shown in FIG. 1 whereby the folding assembly can be locked into the pawl plate member Erected position of FIG. 2 or the folded, retracted position of FIG. 1. The detenting position of the locking means, shown in FIG. 2, is assumed with the lateral pin projection 66 engaging in a substantially vertical leg 68 of slot 70. In this position, the lock means is operative to secure the folding assembly in its vertical, raised position against the resilient bias of the pair of torsion springs 52 and 54 and against any rearward acceleration forces. Raising of lever portion 60 sufficiently to clear lateral projecting pin member 66 from the detent portions or vertical legs 68 of grooves or slots 70 moves this lock means 50 into a releasing position where the resilient bias of springs 52 and 54 is sufficient to urge the folding assembly into its folded, retracted position, shown in FIG. 1.

FIG. 3 is a cross-sectional view along lines 3—3 and illustrates the transverse rib 48, pins 41 and 51 and cros bar 49 in sectional view. The springs such as 54 are coaxially carried on pin 54 in the assembly with a tail 72 extending through a bore 74 in transverse rib 48 of frame 12 and the opposite tail 76 resiliently biased against the crossbar 49 of the fore link means 46.

The cargo restraint is employed for the securing of palletized cargo by mounting a plurality of the restraints at predetermined, spaced-apart locations along a supporting structure such as a seat rail 22 to engage the opposing edges of adjacent parallel. The opposing pallet edges are received beneath the undersurface of the pawl plate members 44 which provide the vertical restraint of the pallets. The forward movement of each pallet is restrained by the fore and aft link means which engage the leading edge of the pallet and which, in turn, bear against the transverse rib 48 that serves as an abutment stop. Since the transverse rib 48 can be made as a integral portion of frame 12 and can be of massive structure, the cargo restraint can accommodate very high acceleration forces in the forward direction, i.e., the direction of the solid arrowhead line 78 shown in FIG. 2. Any rearward forces are carried by the cargo restraint with the trailing edge of a secured pallet bearing against the forward face of the fore link means 46 which bears against the aft link means 56, the latter being restrained in its vertical position by reaction against the opposing (leading) edge of the adjacent pallet and, also, by the lock means 50.

Figure 5:
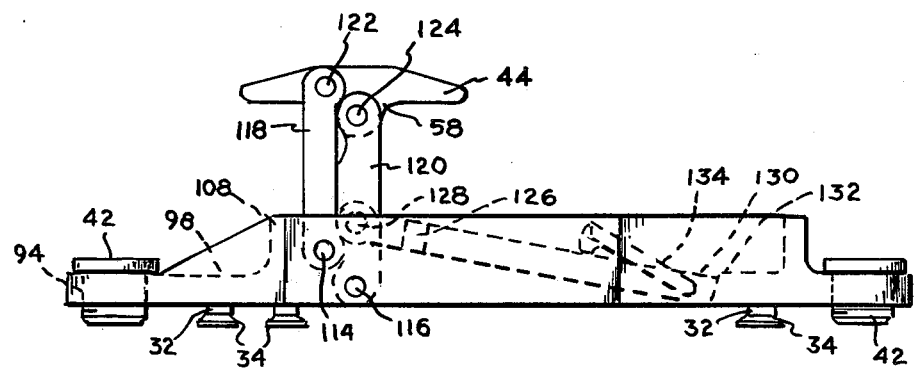

Referring now to FIGS. 4 and 5, there is illustrated a cargo restraint of the invention which offers the advantage of end-to-end reversability, in installation. This cargo restraint has a frame 80 defined by parallel side rails 82 and 84 that distally interconnect tapered end portions 86 and 88. Each of the end sections has an arcuate protrusion 90 and 92 with central apertures 94 and 96 which receive threaded plugs 42 that, as previously mentioned, are employed to interconnect the cargo restraint to the supporting structure such as a seat rail of an air craft cargo and the like.

Each end section also has a flat web portion 98 and 100, and these web portions bear apertures 102, 104 and 106 at preselected positions along the midline of the restraint. Threadably mounted in these apertures are the studs 32 having head 34 which, as previously mentioned, track in the channel of a seat rail.

The frame has a transverse rib 108 adjacent tapered portion 86. Each of the rails 82 and 84 have a pair of vertically staggered apertures 110 and 112 which receive pin members 114 and 116.

Referring now to FIG. 5, the cargo restraint is shown with the pawl plate member 44 in its erected, cargo restraining position. The pawl plate member is vertically elevated above the plane of the frame 80 by the folding link means 118 and 120 which are similar in configuration to the aforedescribed fore link means 46 and aft link means 56 illustrated in FIGS. 1 and 2. Briefly, the link means 118 is a generally H-shaped plate having spaced-apart legs interconnected by a transverse crossbar while the other link means 120 comprises a pair of support arms 120 and 121 (shown in FIG. 4). The fore and aft link means bear distal apertures which receive pin members 122 and 124 that extend transversely through receiving apertures in the pawl plate member 44. To this end, the undersurface of pawl plate member 44 bears a central, raised rib 58 on its undersurface.

The opposite ends of the folding link members 118 and 120 bear apertures which receive the previously mentioned pin members 114 and 116, thereby forming a parallelogram with pawl plate member 44 and frame 80.

The locking means of the assembly is provided with a sufficiently massive structure and positive detent in the erected restraint structure to accept high longitudinal gravitational forces, typically up to about 9 G-forces, thereby permitting the cargo restraint to be reversed end-to-end to fit various applications. To this end, the locking means includes a plate 126 that is pivotally connected to the pair of link arms 120 and 121 by a pin member 128. The opposite end 130 of the plate member bears against an abutment stop formed by the inside edge 132 of web 100. Preferably, this edge 132 is tapered slightly, as shown in FIG. 5, to be at right angles to the longitudinal plane of plate 126. The plate 126 is also provided with a hand ring 134 to permit one to grasp the locking means and disengage the locking plate 126, releasing the locking means from its detenting position shown in FIG. 5.

The assembly is provided with resilient means biasing the assembly into its folded, retracted position. The resilient means comprises a pair of torsion springs 136 and 138 which are mounted on pin member 114 and biased between the transverse rib 108 and the crossbar of link means 118 to bias the link means and associated structure into the folded, retracted position within frame 80.

The assembly is also preferably provided with resilient means biasing locking plate 126 in a downward, clockwise direction as viewed in FIG. 5. The resilient means comprises a pair of torsion springs 140 and 142 which are carried on pin 128 and received within slot 144 in plate 126.

Since plate 126 provides a positive bracing for the assembly of link means and paul member, the cargo restrain shown in FIGS. 4 and 5 can accept high G-forces in either longitudinal direction and, therefore, can be reversed end-to-end in installations, increasing the flexibility of the cargo restraint.

The invention has been described with reference to the presently illustrated and preferred embodiments thereof. It is not intended that the invention be unduly limited by this description of the illustrated, presently preferred embodiment. Instead, it is intended that the invention be defined by the means, and their obvious equivalents, set forth in the following claims.

What is claimed is:

1. A folding cargo restraint which comprises:
   a frame of longitudinal and end cross members;
   a pawl plate member;
   aft leg means and fore leg means, each means pivotally mounted within said frame between said longitudinal members and pivotally attached to said pawl plate member and in parallel alignment to each other to permit retraction of said pawl plate member and aft and fore leg means as a folding parallelogram into a folded position within said frame, and raising of said pawl plate member and leg means into an erected cargo restraining position, elevated above said frame; and
   a transverse rib member spaning between said longitudinal members immediately forward of said fore leg means to provide an abutment to restrain forward movement of said leg means when said pawl plate member is in its erected position.

2. The cargo restraint of claim 1 including resilient means biased between said frame and leg means to urge said leg means toward said folded position.

3. The cargo restraint of claim 2 wherein said fore leg means comprises a pair of lateral, spaced-apart legs with a crossbar therebetween and said resilient means are biased between the transverse rib of said frame and said crossbar.

4. The cargo restraint of claim 3 wherein said fore leg means is pivotally mounted on a pin extending through distal bores in said spaced-apart legs and said resilient means comprises torsion coil springs about said through pin.

5. The cargo restraint of claim 2 including lock means engageable between a detenting position locking said pawl plate member and leg means in its errected cargo restraining position against the bias of said resilient means and a releasing position permitting said resilient means to urge said pawl plate member and leg means into its folded position.

6. The cargo restraint of claim 5 wherein said lock means comprises a plate pivotally attached at its fore edge of said aft leg means and bearing, at its trailing edge, pin means distally received in grooves in said longitudinal frame members.

7. The cargo restraint of claim 6 wherein said grooves have transverse legs constituting detent portions to receive said pin means at the detenting position of said lock means.

8. The cargo restraint of claim 6 wherein said plate bears a raised handle permitting its retraction from its detenting position.

9. The cargo restraint of claim 1 wherein said aft and fore leg means are pivotally mounted in said restraint for abutting engagement when said pawl is in its erected cargo restraining position.

10. The cargo restraint of claim 9 whrein said aft and fore leg members are pivotally mounted on vertically staggered centerlines.

* * * * *